June 21, 1927.
M. JOHNSON
DUMP TRUCK
Filed Aug. 16, 1926
1,633,104
2 Sheets-Sheet 1
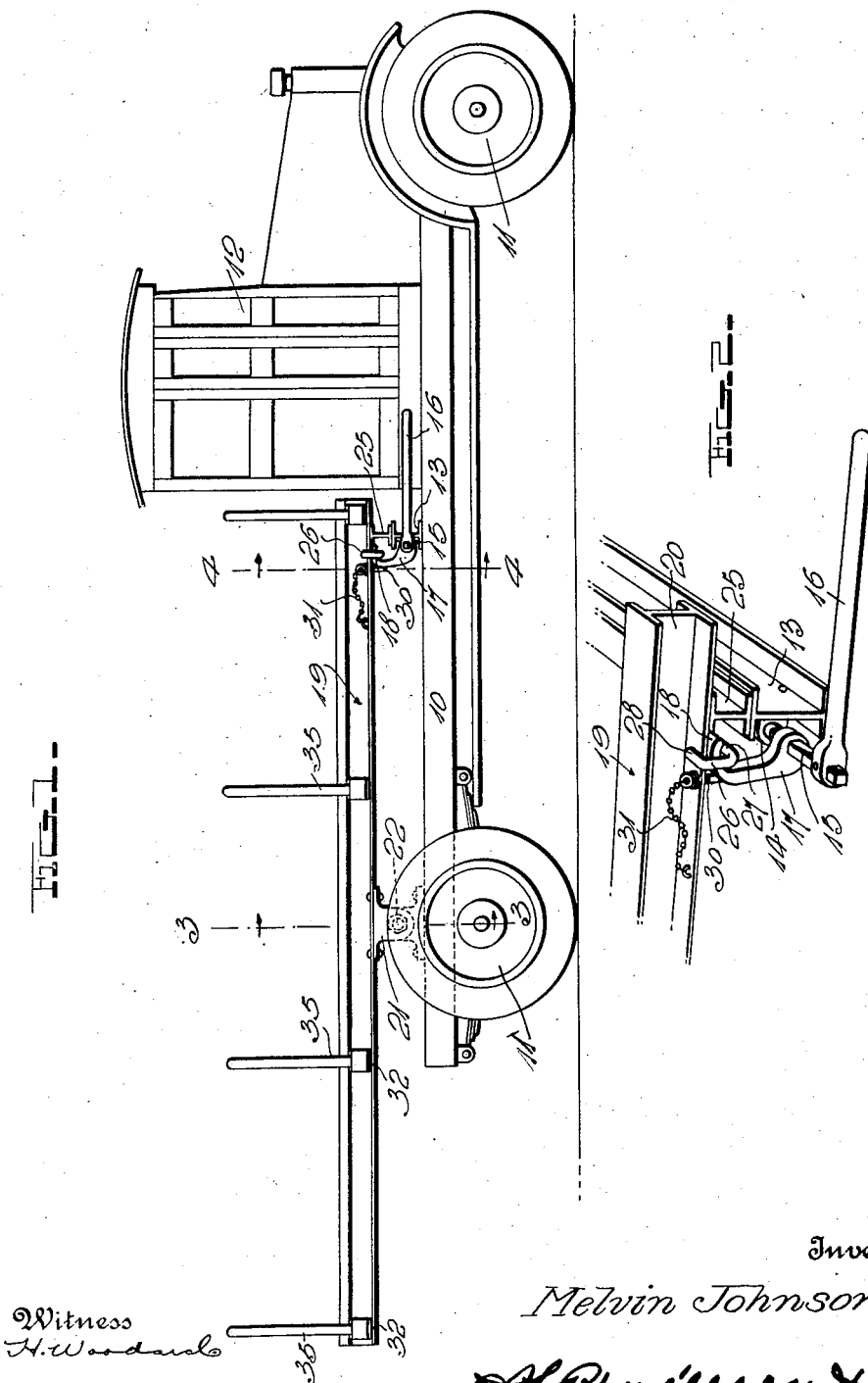
Inventor
Melvin Johnson
Witness
H. Woodard
By H. B. Wilson &Co.
Attorneys

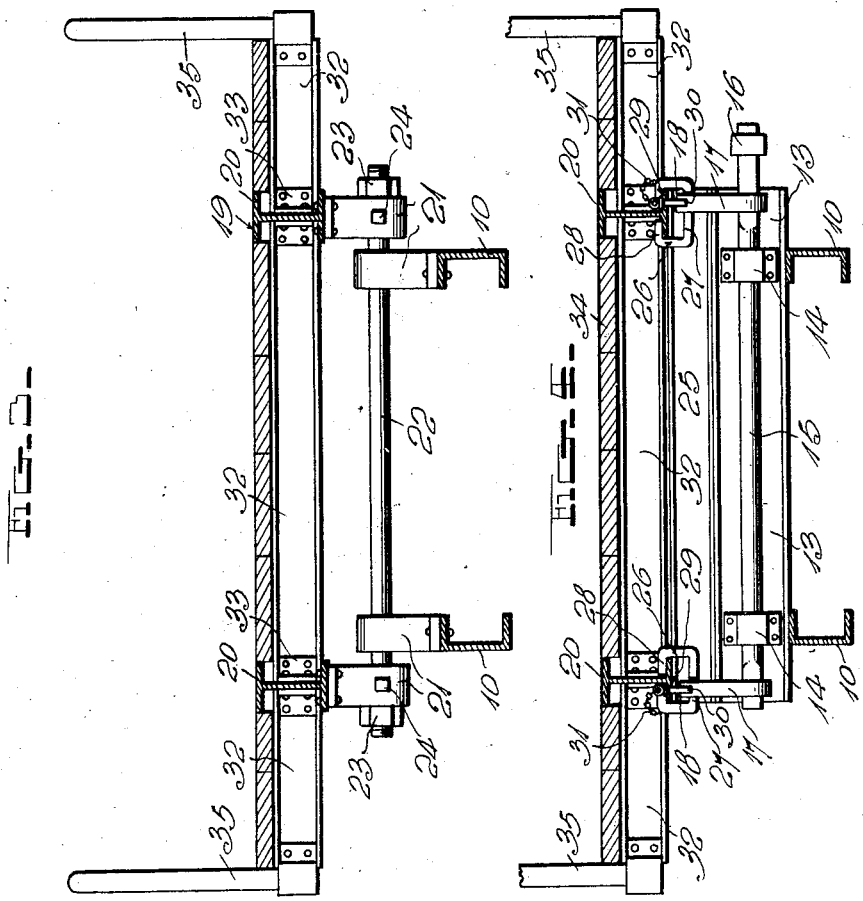

Patented June 21, 1927.

1,633,104

UNITED STATES PATENT OFFICE.

MELVIN JOHNSON, OF DANVILLE, ILLINOIS.

DUMP TRUCK.

Application filed August 16, 1926. Serial No. 129,527.

While the invention relates generally to improvements in dump trucks, it has reference more particularly to a new and improved construction and association of parts for normally holding the body against dumping but for permitting dumping thereof when desired. The preferred use of the invention is in connection with trucks designed for hauling lumber, although it will be understood that it is not restricted to this particular field of use.

It is the object of the invention to provide an exceptionally simple and inexpensive construction and association of parts, yet a construction and arrangement which will be efficient and in every way desirable. With this object in view, the invention resides in the novel subject matter hereinafter described and claimed, the description being supplemented by the accompanying drawings.

Fig. 1 is a side elevation of a truck embodying my invention.

Fig. 2 is a perspective view of the means for normally holding the body against dumping.

Figs. 3 and 4 are vertical transverse sections on lines 3—3 and 4—4 of Fig. 1.

A truck chassis is shown having the usual frame 10, wheels 11 and cab 12. Welded, brazed or otherwise suitably secured upon the side bars of the chassis frame 10, a slight distance behind the cab 12, is a transverse bar 13 preferably in the form of an I-beam. Secured to one side of this beam, preferably the rear side thereof, are two bearings 14, in which a transverse rock shaft 15 is mounted, said rock shaft being provided with a rigidly attached operating handle or lever 16 and having a pair of upstanding arms 17, the upper ends of these arms being provided with hooks 18, both of which extend toward one end of the chassis frame, preferably toward the front end thereof.

Disposed above the chassis frame 10, is a platform or body supporting frame 19, including a pair of longitudinal bars which are preferably in the form of I-beams 20. Suitably shaped bearings 21 are secured to these beams 20 and to the side bars of the chassis frame 10, and a shaft 22 is passed through said bearings so as to hingedly mount the frame 19 upon the chassis frame. Nuts 23 are preferably threaded on the ends of this shaft, and set-screws 24 may be threaded through the bearings 21 carried by the bars 20, causing the shaft to turn in the other bearings when the truck is dumped or when the body or platform is being restored to its initial position after dumping.

Extending transversely under the front ends of the bars 20, is a transverse bar 25 which is preferably in the form of an I-beam, the ends of this beam being secured to the ends of the bars or beams 20, by welding or in any other desired manner. This bar or beam 25 rests normally upon the bar or beam 13 and effectively supports the front portion of the frame 20 and the associated platform or body.

Immediately behind the bar or beam 25, two U-shaped yokes 26 are secured to the bars or beams 20, the arm-connecting or transverse portions 27 of these yokes being downwardly spaced from the bars or beams 20 to underlie the hooks 18. The arms of the yokes 26 straddle the bases of the bars or beams 20 and are turned inwardly upon the latter as indicated at 28, the inwardly turned ends being welded or otherwise secured to said bases. As long as the hooks 18 are engaged with the yokes, the body or platform is held against tilting, but when the shaft 15 is turned by means of the handle or lever 16, so as to release the hooks, quick dumping takes place. After discharging the load, the body or platform is returned by hand and the hooks again engaged with the yokes.

Preferably, an opening 29 is formed through the base of one of the bars or beams 20, immediately behind the adjacent arm 17. A locking pin 30 connected with the frame 19 by a chain or the like 31, may be downwardly inserted through this opening 30 to engage the adjacent hook 18, preventing release of the latter and holding the shaft 15 against accidental turning so that release of the other hook is also prevented. This pin may be easily removed when the truck is to be dumped.

The frame 19 in addition to the characteristics above enumerated, preferably includes a number of transverse bars 32 which are suitably secured at 33 to the longitudinal bars or beams 20, the upper surfaces of the latter being spaced above the upper surfaces of the former, a distance equal to the thickness of the floor boards 34. Thus, the wide upper faces of the bars or beams 20 form portions of the floor surface, economizing in floor material and protecting the wooden flooring to quite an extent, when objects are being hauled which may rest solidly upon both of the bars or beams 20. At the outer edges of the floor, either side walls or stakes 35 may be used, as occasion may demand.

It will be seen from the foregoing that a very simple, inexpensive and desirable construction and arrangement of parts has been provided. On account of the existing advantages of the details shown, they are preferably followed. However, within the scope of the invention as claimed, variations may be made.

I claim:—

1. In a dump truck, a chassis frame including longitudinal side bars; a transverse bar secured upon said side bars, horizontally alined bearings secured to a side of said transverse bar toward one end of the truck, a transverse shaft rockably mounted in said bearings and provided with upstanding arms having hooks at their ends facing one end of the truck, a body-supporting frame above the chassis frame and hinged to the latter for dumping, said body-supporting frame including longitudinal side bars and a transverse bar under and secured to the same, the last named transverse bar resting on the first named transverse bar; U-shaped yokes rigidly secured to the side bars of the body supporting frame and having their transverse portions spaced below the same to underlie the aforesaid hooks, and a handle secured to and projecting from one end of said shaft for turning the latter to release the hooks.

2. In a dump truck, a chassis frame including longitudinal side bars; a transverse bar secured upon said side bars, horizontally alined bearings secured to a side of said transverse bar toward one end of the truck, a transverse shaft rockably mounted in said bearings and provided with upstanding arms having hooks at their ends facing one end of the truck, a body-supporting frame above the chassis frame and hinged to the latter for dumping, said body-supporting frame including longitudinal I-beams above said side bars and a transverse bar resting on the first named transverse bar; U-shaped yokes having their arm-connecting portions disposed under said I-beams to underlie said hooks, the arms of said yokes straddling the bases of said beams, being turned inwardly upon said bases and being secured thereto, one of said bases having an opening near the upper end of one of the hook-carrying arms, a pin downwardly insertible through said opening to engage said arm and prevent accidental release of the hooks, and a handle on said rock shaft for turning it to release said hooks.

In testimony whereof I have hereunto affixed my signature.

MELVIN JOHNSON.